US009619935B2

(12) United States Patent
Dominici et al.

(10) Patent No.: US 9,619,935 B2
(45) Date of Patent: Apr. 11, 2017

(54) METHOD OF THREE-DIMENSIONAL REPRESENTATION OF A SCENE

(71) Applicant: THALES, Neuilly sur Seine (FR)

(72) Inventors: Johanna Dominici, Le Haillan (FR); Jean-Pierre Gerbe, Pessac (FR); Emmanuel Monvoisin, Bordeaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/578,286

(22) Filed: Dec. 19, 2014

(65) Prior Publication Data

US 2016/0171758 A1  Jun. 16, 2016

(30) Foreign Application Priority Data

Dec. 12, 2014  (FR) ...................................... 14 02836

(51) Int. Cl.

| | |
|---|---|
| *G06T 15/00* | (2011.01) |
| *G06T 17/05* | (2011.01) |
| *G01C 21/00* | (2006.01) |
| *G06T 19/00* | (2011.01) |
| *G06T 19/20* | (2011.01) |

(Continued)

(52) U.S. Cl.
CPC .............. *G06T 17/05* (2013.01); *G01C 21/00* (2013.01); *G01C 23/005* (2013.01); *G06T 15/50* (2013.01); *G06T 19/003* (2013.01); *G06T 19/20* (2013.01); *G06T 2200/04* (2013.01); *G06T 2219/2012* (2013.01)

(58) Field of Classification Search
None
See application file for complete search history.

(56) References Cited

U.S. PATENT DOCUMENTS

| | | |
|---|---|---|
| 7,098,913 B1 | 8/2006 | Etherington et al. |
| 8,264,498 B1 | 9/2012 | Vanderkamp et al. |

(Continued)

OTHER PUBLICATIONS

Jeff Jenness Manual: DEM Surface Tools for ArcGIS—"An ArcGIS Extension for Analyzing Raster Elevation Datasets" (http://www.jennessent.com/downloads/dem%20surface%20tools%20for%20arcgis.pdf), pp. 1-95, Last modified May 13, 2013.*

(Continued)

*Primary Examiner* — Frank Chen
(74) *Attorney, Agent, or Firm* — Blakely, Sokoloff, Taylor & Zafman LLP (57) ABSTRACT

The general field of the invention is that of methods of three-dimensional synthetic representation of a terrain. These methods are implemented in a vehicle piloting and navigation aid system. The method according to the invention comprises the following steps:

Step 1: Computation, for a determined position of the vehicle, of a first part or of the entirety of the terrain seen through the viewing system;

Step 2: Computation, for the said terrain portion, of the curvature of the said terrain at each point;

Step 3: Computation, as a function of the position and of the orientation of the carrier, of the position of the displayed points;

Step 4: Computation of the luminance of each point of the said visible terrain portion according to a determined law, dependent on the said curvature;

Step 5: Display by the viewing system of the luminance of each point.

13 Claims, 5 Drawing Sheets

(51) Int. Cl.
*G06T 15/50* (2011.01)
*G01C 23/00* (2006.01)

(56) References Cited

U.S. PATENT DOCUMENTS

| | | | | |
|---|---|---|---|---|
| 2006/0114363 | A1* | 6/2006 | Kang | H04N 21/23412 348/838 |
| 2008/0278515 | A1* | 11/2008 | Gannon | G06T 17/05 345/593 |
| 2009/0040070 | A1* | 2/2009 | Alter | G01C 23/00 340/945 |
| 2010/0315421 | A1* | 12/2010 | Ford | G06T 15/50 345/426 |
| 2011/0227944 | A1* | 9/2011 | Feyereisen | G06T 11/00 345/632 |
| 2012/0036480 | A1* | 2/2012 | Warner | G06F 3/04847 715/833 |
| 2014/0100721 | A1* | 4/2014 | Baudson | G06T 19/006 701/14 |

OTHER PUBLICATIONS

Kyung Gun Na, et al., "Redeeming Valleys and Ridges for Line-Drawing", Advances in Multimedia Information Processing—PCM 2005, Part I, Lecture Notes in Computer Science, vol. 3767, pp. 327-338, (2005).

* cited by examiner

METHOD OF THREE-DIMENSIONAL REPRESENTATION OF A SCENE

BACKGROUND OF THE INVENTION

1. Field of the Invention

The field of the invention is that of synthetic and three-dimensional cartographic representation. The latter can be represented in head-up mode, as a conformal view, or in head-down mode. The expression conformal representation is intended to mean a cartographic representation which is perfectly superimposed on the terrain actually seen by the observer. Optical superposition is ensured by an optical system which projects the synthetic image towards the observer's eye. This optical system comprises an optical mixer or combiner which ensures the superposition of the image on the outside landscape. This type of representation is particularly used in aeronautics so as to ensure piloting under poor visibility or at night. In head-down mode, the synthetic view does not conform to the outside landscape (by definition) but can be positioned perfectly with respect to the primary piloting symbology displayed, if there is symbology.

2. Description of the Prior Art

Figure 1:
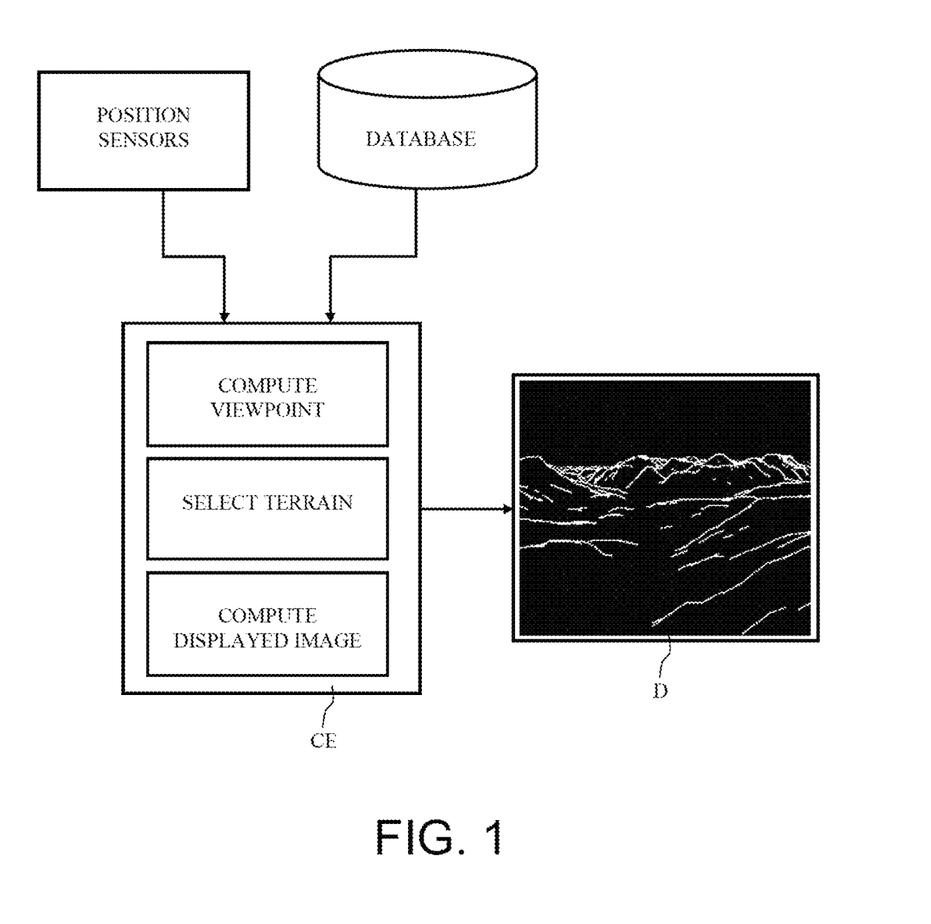
FIG. 1 represents the schematic of a cartographic representation system.

A cartographic representation system is represented in FIG. 1. This system comprises a database representative of the terrain overflown, means making it possible to determine the position and the orientation of the viewing system displaying the cartographic image, an image generator CE and the viewing system D. The image generator CE ensures three main functions which are the computation of the viewpoint, the selection of the terrain zone to be displayed and the computation of the image to be displayed as a function of the viewpoint.

One of the tricky points with this three-dimensional representation is that it must be sufficiently complete and precise to afford a good representation of the terrain overflown which may be useful for piloting and for navigation and sufficiently discreet as not to saturate the natural image of the landscape.

Various solutions have been proposed.

A first solution for representing a 3D terrain compatible with a head-up viewing system is described in U.S. Pat. No. 8,264,498 entitled "System, apparatus, and method for presenting a monochrome image of terrain on a head-up display unit". In this representation, the luminous intensity of the terrain is modulated as a function of the lighting parameters obtained by positioning a virtual pointlike or omnidirectional light source above the terrain overflown. This representation greatly overloads the display and does not correctly address the need for superimposition of the synthetic image with the real view.

Figure 2:
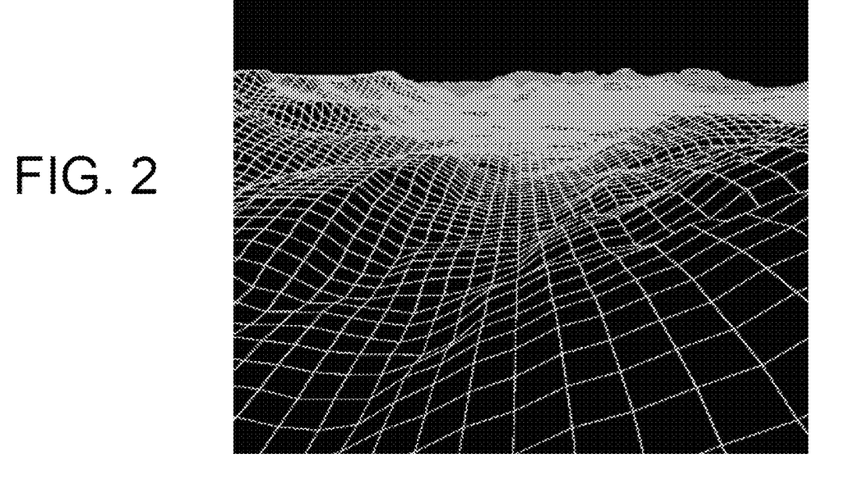
FIGS. 2, 3, 4 and 5 represent three-dimensional cartographic representations of a terrain according to the prior art.

A second solution consists in displaying the terrain with the aid of a simple grid as represented in FIG. 2. Distance perception is effected solely through the size of the geometric elements of the grid which are represented as white lines in FIG. 2. Indeed, under the effect of perspective, the greater their distance with respect to the displayed viewpoint, the smaller the geometric elements on the screen. This type of display is not suitable for the display of terrain very remote from the observer. U.S. Pat. No. 7,098,913 entitled "Method and system for providing depth cues by attenuating distant displayed terrain" proposes a solution for improving the representation consisting in darkening the terrain remote from the viewpoint. This technique allows better apprehension of the distance of the terrain but this does not solve the problem of saturation of the image.

Figure 3:
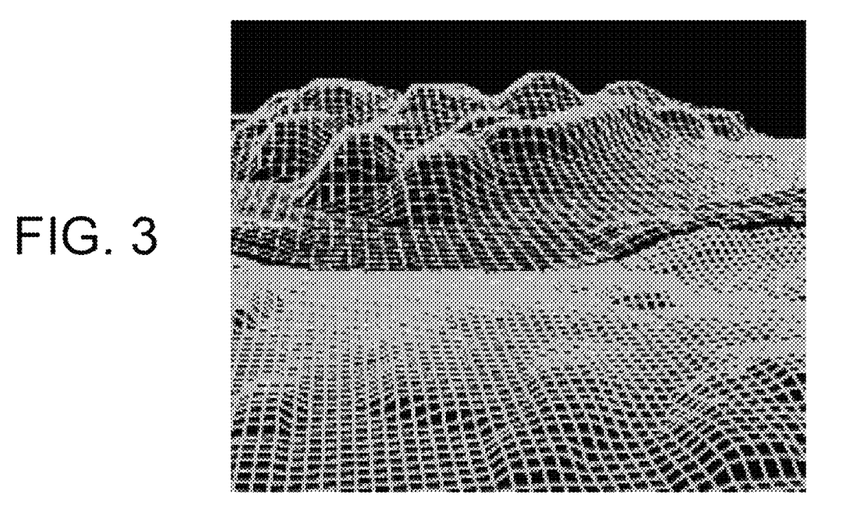

A third solution which is a variant of the previous solution consists in modifying the size of the geometric elements onwards of a certain distance. For example, only one point out of two of the elevation mesh is retained. By way of example, FIG. 3 illustrates this type of graphical representation. One indeed succeeds in limiting the number of elements displayed on the screen, but one deletes a large part of the elements making it possible to improve the perception of the depth of the terrain. In fact, the representation of a 3D synthetic terrain by a grid is very suitable for the terrain close to the viewpoint.

Figure 4:
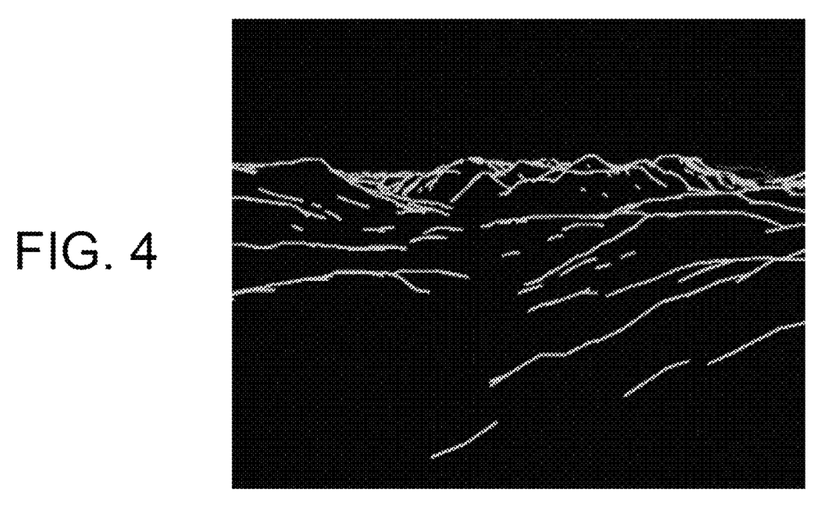

A fourth solution consists in presenting the terrain by highlighting the ridge lines. The expression ridge line is intended to mean the boundaries between the hidden parts and the visible parts of the landscape. The ridge lines do not necessarily represent a series of points whose altitude is locally maximal. They are therefore dependent not only on the terrain but also on the position of the observer. The ridge lines must therefore be recomputed continually as a function of the position of the carrier. This makes it possible to afford some information about the relief of the terrain without overloading the image. Such a representation is depicted in FIG. 4. This representation of the terrain by the ridge lines makes it possible to greatly limit the information density displayed on the screen. It affords partial vision of the environment, this being beneficial for the perception of the remote terrain. However, it affords only extremely restricted information on the terrain close to the viewpoint.

Figure 5:
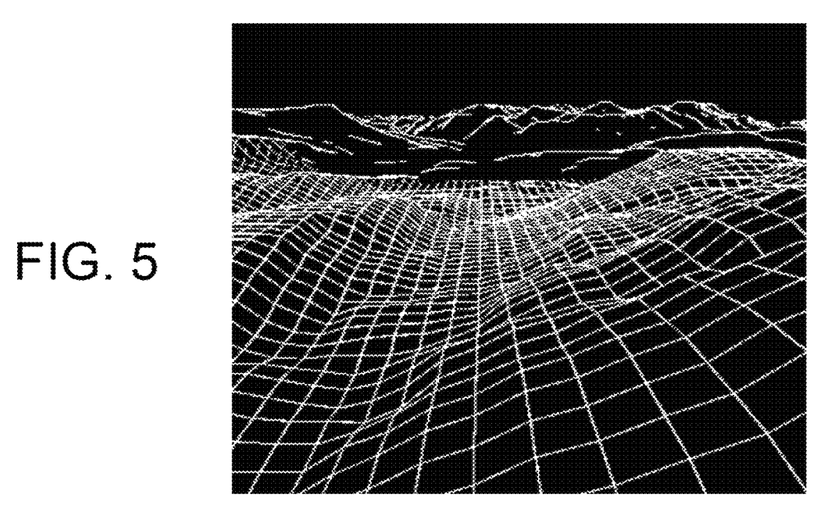

Two of the graphical representations cited hereinabove can be used simultaneously. Thus, it is possible to represent the close terrain in the form of a grid and the remote terrain in the form of ridge lines as is seen in FIG. 5. Between the representation of the terrain in the form of a grid and the representation in the form of ridge lines, the transition is ensured by a principle of crossfading based on the terrain distance. Up to a distance close to the previously defined distance, the terrain is represented in both modes. Then, as a predefined distance is approached, the plot in the form of a grid becomes toned down while the ridge line representation is accentuated. The latter solution makes it possible to actually decrease the information on the screen and seems suitable for displaying the terrain information situated in the background but engenders artefacts of display. These artefacts are, for example, the sudden appearance and/or disappearance of the ridge lines when we are close to the viewpoint, the absence of potentially relevant terrain information such as valleys or thalwegs. Consequently, the latter representation does not yet provide an optimal level of terrain perception.

SUMMARY OF THE INVENTION

As FIGS. 2, 3, 4 and 5 show, the various cartographic representations according to the prior art do not make it possible to appreciably decrease the amount of data displayed on the screen without decreasing the perception of the depth of the terrain. The method of cartographic representation according to the invention does not exhibit these drawbacks. It displays not simply the ridge lines but, in a more general manner the curvature of the terrain. It does not display only the local minima and maxima of the curvature, but indeed the curvature at any point of the terrain. The representation is then a gradation of grey levels or other colours and not just a set of lines, such as is described in the publication "Redeeming valleys and ridges for line-drawing", PCM 2005, Part I, LNCS 3767, pp 327-338. A realistic representation of the terrain is obtained, which is easily comprehensible and occupies a limited space.

In what follows, a small unit of surface which corresponds to a pixel displayed by the viewing system is called a "point" of the terrain. Also, the inverse of the radius of curvature at a given location of the terrain is called the "curvature" at this location. Thus, a perfectly flat terrain has zero curvature.

More precisely, the subject of the invention is a method of three-dimensional synthetic representation of a terrain, the said method being implemented in a vehicle piloting and navigation aid system, the said aid system comprising at least one navigation system, a cartographic database and a viewing system allowing the display of synthetic images, characterized in that the said method comprises the following steps:

Step 1: Computation, for a determined position of the vehicle, of the terrain portion seen through the viewing system;

Step 2: Computation, for the terrain portion determined in the previous step, of the curvature of the said terrain at each point, the curvature corresponding to a variation of orientation of the terrain;

Step 3: Computation, as a function of the position and of the orientation of the vehicle, of the position on the screen of the points for the said position of the vehicle and for the said visible terrain portion;

Step 4: Computation of the luminance of each point of the said visible terrain portion according to a determined law, dependent at least on the said curvature;

Step 5: Display by the viewing system of the luminance of each point.

Advantageously, step 3 is followed by the following steps, the said steps preceding step 4:

Step 3.1: Computation of the vector normal to the terrain at each point of the said visible portion of the terrain;

Step 3.2: Computation, for each point of a direction vector whose origin is located at the level of this point and whose vertex is located at the level of a reference point;

Step 3.3: Computation, for each point, of the angle of inclination between the direction of the vector normal to the terrain and the direction of the direction vector;

Step 3.4: Computation of the luminance of each point of the said visible portion according to a law dependent on the said curvature and the said angle of inclination.

Advantageously, step 4 is followed by the following steps, the said steps preceding step 5:

Step 4.1: Computation, up to a determined distance, reckoned from the determined position of the vehicle, of a representation of the terrain in the form of a grid, that is to say of a regular cross-ruling disposed on the terrain;

Step 4.2: Display by the viewing system of the said grid up to the determined distance.

Advantageously, the luminance of the points of the terrain is an increasing function of the curvature.

Advantageously, the luminance of the points of the terrain is an increasing function of the angle of inclination.

Advantageously, the luminance of the points of the terrain is zero when the curvature of the terrain is below a certain threshold.

Advantageously, the luminance of the points of the terrain is a function of the distance from the aircraft.

Advantageously, the luminance of the points of the terrain decreases as the distance from the aircraft increases.

Advantageously, the graphical representation is fused with one or more types of three-dimensional representation of the terrain.

Advantageously, the graphical representation is fused with a representation of the terrain in the form of a shading.

Advantageously, the graphical representation is fused with a representation of the terrain in the form of a gradation of one or more colours, each colour representing a determined altitude level.

The invention also relates to a vehicle piloting and navigation aid system, the said aid system comprising at least one navigation system, a cartographic database and a viewing system allowing the display of synthetic images, the said system comprising electronic computation means arranged so as to implement the method of three-dimensional synthetic representation of a terrain defined hereinabove.

Advantageously, the vehicle is an aircraft and the piloting and navigation aid system is the avionics system of the said aircraft.

BRIEF DESCRIPTION OF THE DRAWINGS

The invention will be better understood and other advantages will become apparent on reading the nonlimiting description which follows and by virtue of the appended figures among which.

DETAILED DESCRIPTION

To be implemented, the method of graphical representation according to the invention requires a vehicle piloting and navigation aid system. The vehicle can be of various types. In its main application, the method is implemented in an aircraft so as to provide the pilot with the best possible representation of the outside landscape. The piloting aid system is the onboard avionics system of the craft. Such systems exist today on all modern aircraft. They must comprise:

A navigation system making it possible to determine the position and the attitude of the aircraft. By way of examples, these navigation systems comprise inertial platforms and/or systems of "GPS" type, the acronym standing for "Global Positioning System";

A cartographic database of the terrain overflown;

An electronic computer making it possible to carry out, inter alia, data processing and graphical representation computations and implementing the display method according to the invention;

A viewing system, preferably comprising either a so-called "Head-Down" viewing device, situated on the instrument panel for example, or a so-called "Head-Up" or "See-Through Display" viewing device. These devices can be transparent screens or "Head-Up" visors, also called "Head-Up Displays" or "Head-Worn Displays" or "Head-Mounted Displays". These latter devices comprise a screen or an optical component which superimposes the image of the viewing system on the outside.

In its basic embodiment, the method according to the invention comprises the following steps:

Step 1: Computation, for a determined position of the vehicle, of the terrain portion seen through the viewing system;

Step 2: Computation, for the terrain portion determined in the previous step, of the curvature of the said terrain at each point, the curvature corresponding to a variation of orientation of the terrain;

Step 3: Computation, as a function of the position and of the orientation of the vehicle, of the position on the screen of the points for the said position of the vehicle and for the said visible terrain portion;

Step 4: Computation of the luminance of each point of the said visible terrain portion according to a determined law, dependent on the said curvature;

Step 5: Display by the viewing system of the luminance of each point.

Figure 6:
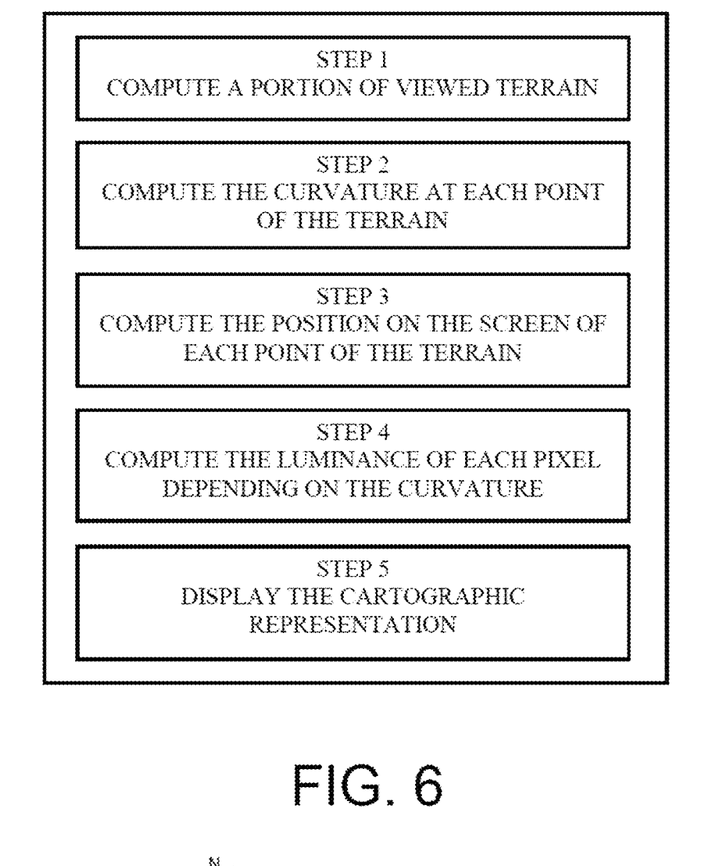
FIG. 6 represents the main steps of the method of cartographic representation according to the invention.
Figure 7:
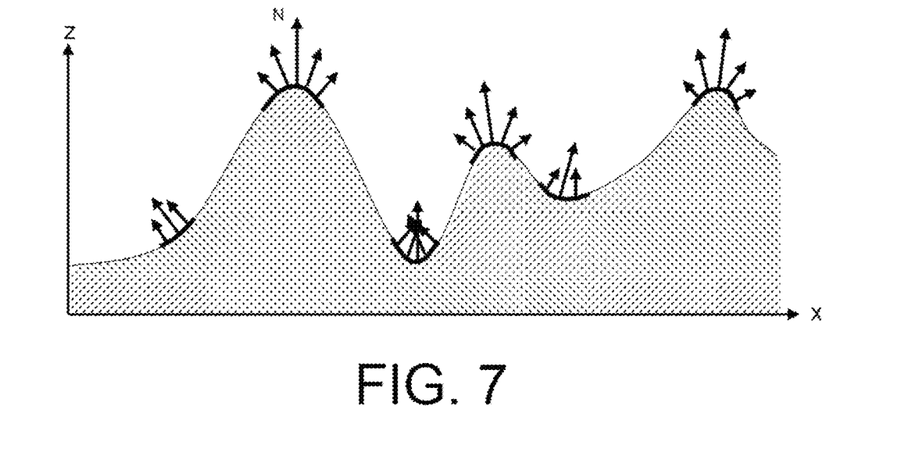
FIG. 7 represents the principle of the cartographic representation according to the invention.

These steps are represented in FIG. 6. Step 2 is illustrated in FIG. 7. This figure represents a view in a sectional plane (x, z) of a terrain. The local curvature of the terrain CL corresponds to the local variation of the orientation of the terrain. Three types of curvature of the terrain may be distinguished. The first type corresponds to a fast variation of the curvature without inversion of this curvature, the second type corresponds to a high inversion of the curvature, the curvature of the terrain corresponds in this case to the passage of a ridge C. Finally, the third type of curvature corresponds to a low inversion of the curvature of the terrain, it corresponds in this case to the passage of a thalweg T.

In FIG. 7, the zones of the terrain having a relevant curvature to be represented are shown with a bold line. They correspond to the zones where the curvature is significant. It may be seen in FIG. 7 that at each point of the terrain, a normal vector N is computed, whose norm is proportional to the value of the curvature.

In this first embodiment, the rendition of the curvature of the terrain is dependent on the significance of the curvature of the terrain. More precisely, the luminance at each point of the terrain is a function of the degree of the curvature of the terrain, the lower the curvature, the lower the luminance of the rendition. In this mode, the luminance can be proportional to the terrain curvature value. It can also obey other laws of variation depending on whether or not it is desired to accentuate the representations of the curvature variations.

It is then understood that, when the terrain is particularly rugged, the luminance generated by the representation of the curvature of the terrain in each pixel may be significant and encumber the observation of the outside landscape.

It is therefore possible to improve this graphical representation by indexing the luminance of each point or pixel of the terrain on the angle of inclination with respect to a reference point, this reference point generally being the observation point, that is to say the position of the vehicle. More precisely, in this variant, the method according to the invention comprises the following additional steps:

Step 3.1: Computation of the vector normal to the terrain at each point of the said visible portion of the terrain;

Step 3.2: Computation, for each point of a direction vector whose origin is located at the level of this point and whose vertex is located at the level of a reference point;

Step 3.3: Computation, for each point, of the angle of inclination between the direction of the vector normal to the terrain and the direction of the direction vector;

Step 3.4: Computation of the luminance of each point of the said visible portion according to a law dependent on the said curvature and the said angle of inclination.

Figure 8:
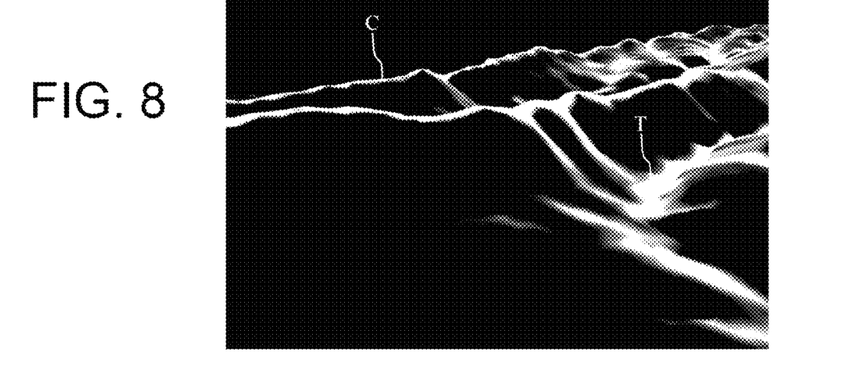
FIG. 8 represents a first cartographic representation arising from the method according to the invention.

By way of example, a graphical representation such as illustrated in FIG. 8 is then obtained. In this figure, the curvature of the terrain is represented according to a luminance scale ranging from white for a significant curvature to black, for a zero curvature which corresponds to a flat terrain. The luminance scale may be linear or non-linear. For example, in a Head-Up viewing device, the curvature of the terrain is represented according to a luminance scale ranging from a given intensity for a significant curvature to transparency, for a zero curvature so as to minimally mask the vision of the outside. Generally, for a Head-Up viewing system, the chosen colour representative of the terrain is green. It may be seen, in the representation of FIG. 8, that the whole terrain is well represented and that the representation accentuates the terrain curvature variations, providing a more intuitive reading of the reliefs such as the ridges C, the valleys and the thalwegs T.

The luminance variation is not necessarily linear with the value of the curvature of the terrain. It is thus possible to accentuate significant terrain curvatures such as ridges, valleys or thalwegs without overloading the image or dazzling the user, and therefore allowing him to retain the clearest possible view of the outside landscape. It is possible, moreover, to associate therewith a threshold below which the curvature of the terrain is no longer displayed. That is to say a zero luminance is associated with these points or pixels of the terrain whose curvature is lower than this determined threshold.

Advantageously, the luminance can be made to depend on the distance from the aircraft. More precisely, for each pixel of the terrain, the luminance decreases as the terrain gets more remote from the aircraft. This makes it possible to attenuate the representation and therefore to not overload the image for the remote distances whose density of information to be displayed is high, on account of the perspective effect which constricts the distant terrain.

Advantageously, the graphical representation in the form of curvature of the terrain can be fused with a more conventional three-dimensional representation of a 3D terrain. For example, the graphical representation in the form of curvature of the terrain can be overlaid on a graphical representation by shading, or by gradation of colour representing the altitude of the terrain. Each colour stratum represents an altitude level.

Figure 9:
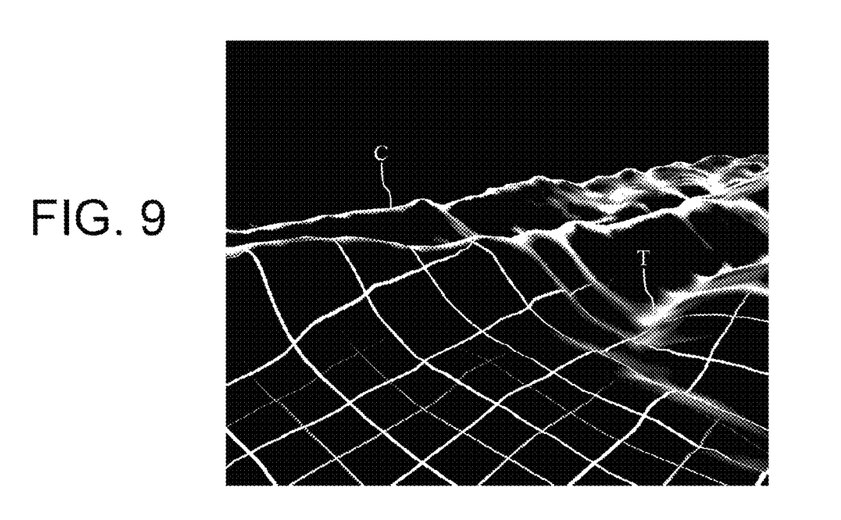
FIG. 9 represents a second, "mixed", cartographic representation arising from the method according to the invention.

It is also seen in FIG. 8 that the zones situated a short distance away comprise less information about the curvature of the terrain than the remote zones. This is due to the perspective effect which constricts the distant terrain. Hence, it may be beneficial to supplement the graphical representation in the form of curvature of the terrain with a representation of the terrain in the form of a grid, as represented in FIG. 9.

More precisely, in the latter variant, the method according to the invention comprises the following additional steps, the said steps preceding step 5:

Step 4.1: Computation, up to a determined distance, reckoned from the determined position of the vehicle, of a representation of the terrain in the form of a grid, that is to say of a regular cross-ruling disposed on the terrain;

Step 4.2: Display by the viewing system of the said grid up to the determined distance.

By way of example, a graphical representation is then obtained such as illustrated in FIG. 9 which represents the same terrain as that of FIG. 8 but supplemented in the foreground with a representation in the form of a grid. A three-dimensional representation of the terrain is thus obtained which is perfectly readable and perfectly suitable according to the proximity of the terrain.

What is claimed is:

1. A method of a three-dimensional synthetic representation of a terrain comprising:
   computing, by a vehicle piloting and navigation aid system, a terrain portion seen through a viewing system of the vehicle piloting and navigation aid system for a determined position of a vehicle, the vehicle piloting and navigation aid system comprising at least one of a navigation system, a cartographic database, and the viewing system to allow a display of synthetic images;
   computing, by the vehicle piloting and navigation aid system, a curvature of the terrain at each point for the determined terrain portion, wherein each point comprises a small unit of surface corresponding to a pixel displayed by the viewing system, and wherein the curvature corresponds to a variation of an orientation of the terrain;
   computing, as a function of the determined position of the vehicle and an orientation of the vehicle, a position on a screen of the viewing system based on the points for the determined position of the vehicle and the terrain portion, wherein computing the position on the screen of the viewing system further comprises:
      computing, for each point, a direction vector whose origin is located at a level of the respective point and whose vertex is located at a level of a reference point;
      computing, for each point, an angle of inclination between a direction of the vector normal to the terrain and a direction of the direction vector;
      computing a luminance of each point of the terrain portion according to a law, wherein the law is based on the curvature and the angle of inclination;
   computing, by the vehicle piloting and navigation aid system, a luminance of each point of the terrain portion according to a determined law, wherein the determined law is at least based on the curvature; and
   displaying, by the viewing system, the luminance of each point.

2. The method of the three-dimensional synthetic representation of the terrain according to claim 1, wherein computing, as the function of the determined position of the vehicle and the orientation of the vehicle, the position on the screen of the viewing system based on the points for the determined position of the vehicle and the terrain portion, further comprises:
   computing a vector normal to the terrain at each point of the terrain portion.

3. The method of the three-dimensional synthetic representation of the terrain according to claim 2, wherein the luminance of the points of the terrain is an increasing function of the angle of inclination.

4. The method of the three-dimensional synthetic representation of the terrain according to claim 1, wherein computing the luminance of each point of the terrain portion according to the determined law, further comprising:
   computing a determined distance based on the determined position of the vehicle, of a representation of the terrain in the form of a grid, wherein the grid is a regular cross-ruling that is disposed on the terrain;
   displaying, by the viewing system, the grid in reference to the determined distance.

5. The method of the three-dimensional synthetic representation of the terrain according to claim 1, wherein the luminance of the points of the terrain is an increasing function of the curvature.

6. The method of the three-dimensional synthetic representation of the terrain according to claim 1, wherein the luminance of the points of the terrain is zero when the curvature of the terrain is below a certain threshold.

7. The method of the three-dimensional synthetic representation of the terrain according to claim 1, wherein the luminance of the points of the terrain is a function of the distance from the vehicle.

8. The method of the three-dimensional synthetic representation of the terrain according to claim 7, wherein the luminance of the points of the terrain decreases as the distance from the vehicle increases.

9. The method of the three-dimensional synthetic representation of the terrain according to claim 1, wherein a graphical representation is fused with one or more types of three-dimensional representation of the terrain.

10. The method of the three-dimensional synthetic representation of the terrain according to claim 9, wherein the graphical representation is fused with a representation of the terrain in the form of a shading.

11. The method of the three-dimensional synthetic representation of the terrain according to claim 9, wherein the graphical representation is fused with a representation of the terrain in the form of a gradation of one or more colors, each color representing a determined altitude level.

12. A vehicle piloting and navigation aid system, comprising:
   at least one of a navigation system, a cartographic database, and a viewing system to allow a display of synthetic images;
   a processor; and
   a memory coupled to the processor for storing instructions, which when executed from the memory, cause the processor to perform operations for a three-dimensional synthetic representation of a terrain, the operations including:
      computing a terrain portion seen through the viewing system for a determined position of a vehicle,
      computing a curvature of the terrain at each point for the determined terrain portion, wherein each point comprises a small unit of surface corresponding to a pixel displayed by the viewing system, and wherein the curvature corresponds to a variation of an orientation of the terrain,
      computing, as a function of the determined position of the vehicle and an orientation of the vehicle, a position on a screen of the viewing system based on the points for the determined position of the vehicle and the terrain portion,
      wherein computing the position on the screen of the viewing system further comprises:
         computing, for each point, a direction vector whose origin is located at a level of the respective point and whose vertex is located at a level of a reference point;
         computing, for each point, an angle of inclination between a direction of the vector normal to the terrain and a direction of the direction vector;
         computing a luminance of each point of the terrain portion according to a law, wherein the law is based on the curvature and the angle of inclination, computing a luminance of each point of the terrain portion according to a determined law, wherein the determined law is at least based on the curvature, and displaying, by the viewing system, a luminance of each point.

13. The vehicle piloting and navigation aid system according to claim 12, wherein the vehicle is an aircraft and the piloting and navigation aid system is an avionics system of the aircraft.

\* \* \* \* \*